United States Patent [19]

Ledinh et al.

[11] Patent Number: 4,782,344
[45] Date of Patent: Nov. 1, 1988

[54] MICROWAVE SIZE/SPEED VEHICLE DETECTOR

[75] Inventors: Chon T. Ledinh; Mansour Loloyan; Roger Garceau, all of Quebec, Canada

[73] Assignee: Centre de Recherche Industrielle du Quebec, Quebec, Canada

[21] Appl. No.: 27,249

[22] Filed: Mar. 18, 1987

[51] Int. Cl.⁴ .............................................. G01S 3/02
[52] U.S. Cl. ..................................... 342/351; 342/52; 364/557
[58] Field of Search ................. 342/52, 351; 343/703; 374/121, 122, 133, 129; 364/557, 517; 382/53; 340/933, 936, 939, 943

[56] References Cited

U.S. PATENT DOCUMENTS

| | | | |
|---|---|---|---|
| 3,735,405 | 5/1973 | Berg ..................................... | 342/351 |
| 3,883,876 | 5/1975 | Roeder et al. ...................... | 342/425 |
| 4,420,265 | 12/1983 | Everest et al. ..................... | 374/133 |
| 4,511,897 | 4/1985 | Lindner ............................... | 342/351 X |
| 4,521,861 | 6/1985 | Logan et al. ....................... | 342/351 X |
| 4,560,923 | 12/1985 | Hanson ............................... | 324/61 QL |

FOREIGN PATENT DOCUMENTS

| | | | |
|---|---|---|---|
| 679367 | 2/1964 | Canada ................................. | 342/351 |
| 81/00764 | 5/1981 | World Int. Prop. O. .......... | 374/133 |

*Primary Examiner*—Thomas H. Tarcza
*Assistant Examiner*—Tod R. Swann
*Attorney, Agent, or Firm*—Oblon, Fisher, Spivak, McClelland, & Maier

[57] ABSTRACT

A vehicle sensing apparatus and method for detecting the size and speed of a vehicle travelling on a roadway. The apparatus comprises a directional microwave non-emitting antenna for collecting reflected microwave signals from above a roadway. An electronic vehicle sensing circuit is connected to the antenna for processing detected signals to identify a vehicle's physical parameter. The sensing circuit has an ambient temperature detector and a peak detector, the latter detecting a reflected temperature signal at said antenna and generating a detected temperature signal. A physical parameter calculating circuit is provided for determining the true amplitude of the detected signal and interpreted by the maximum ratio of the solid angles of the antenna beam filled by the vehicle to be detected and a roadway in the beam of the antenna. A processing circuit (ROM) is provided to identify the vehicle's physical parameter. A vehicle speed calculating circuit (ROM) is also connected to the peak detector for providing a value of the antenna effective footing length to a divider circuit which is also fed a half pulse time whereby to provide a corrected velocity output signal.

12 Claims, 3 Drawing Sheets

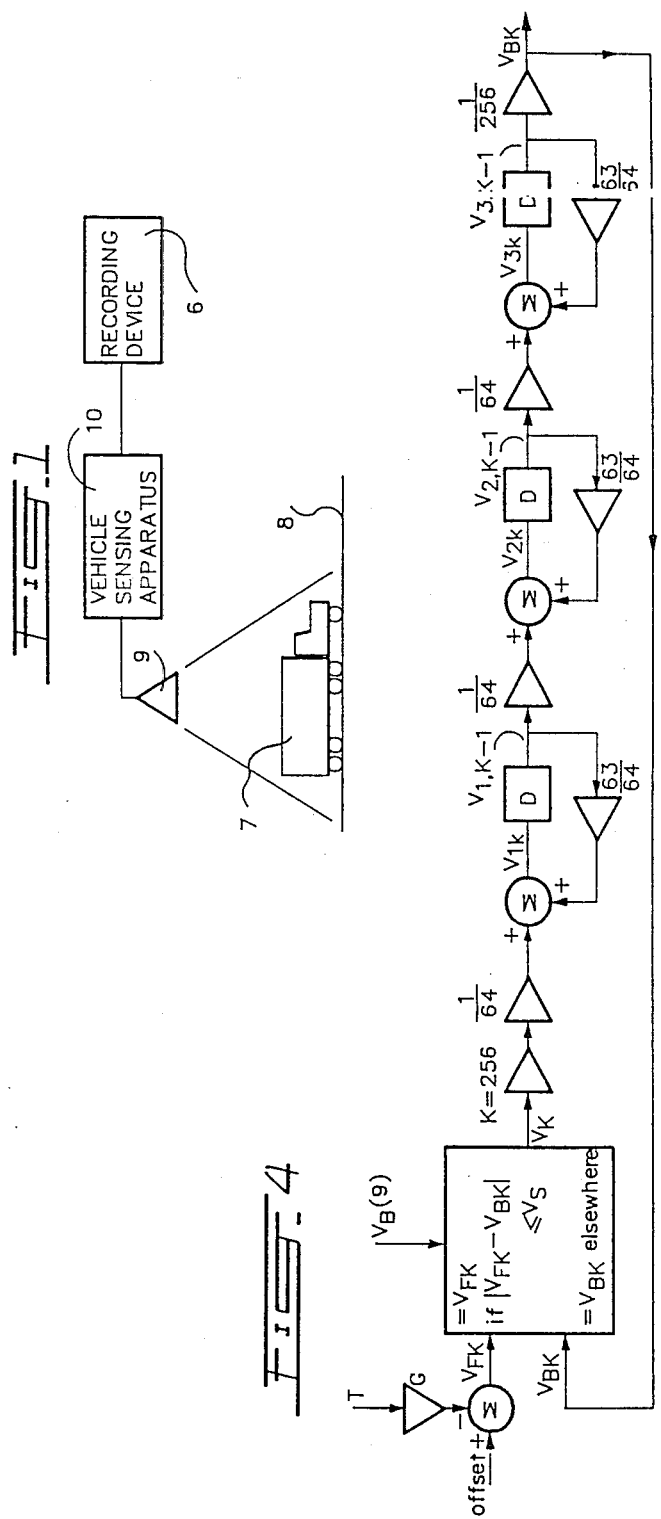

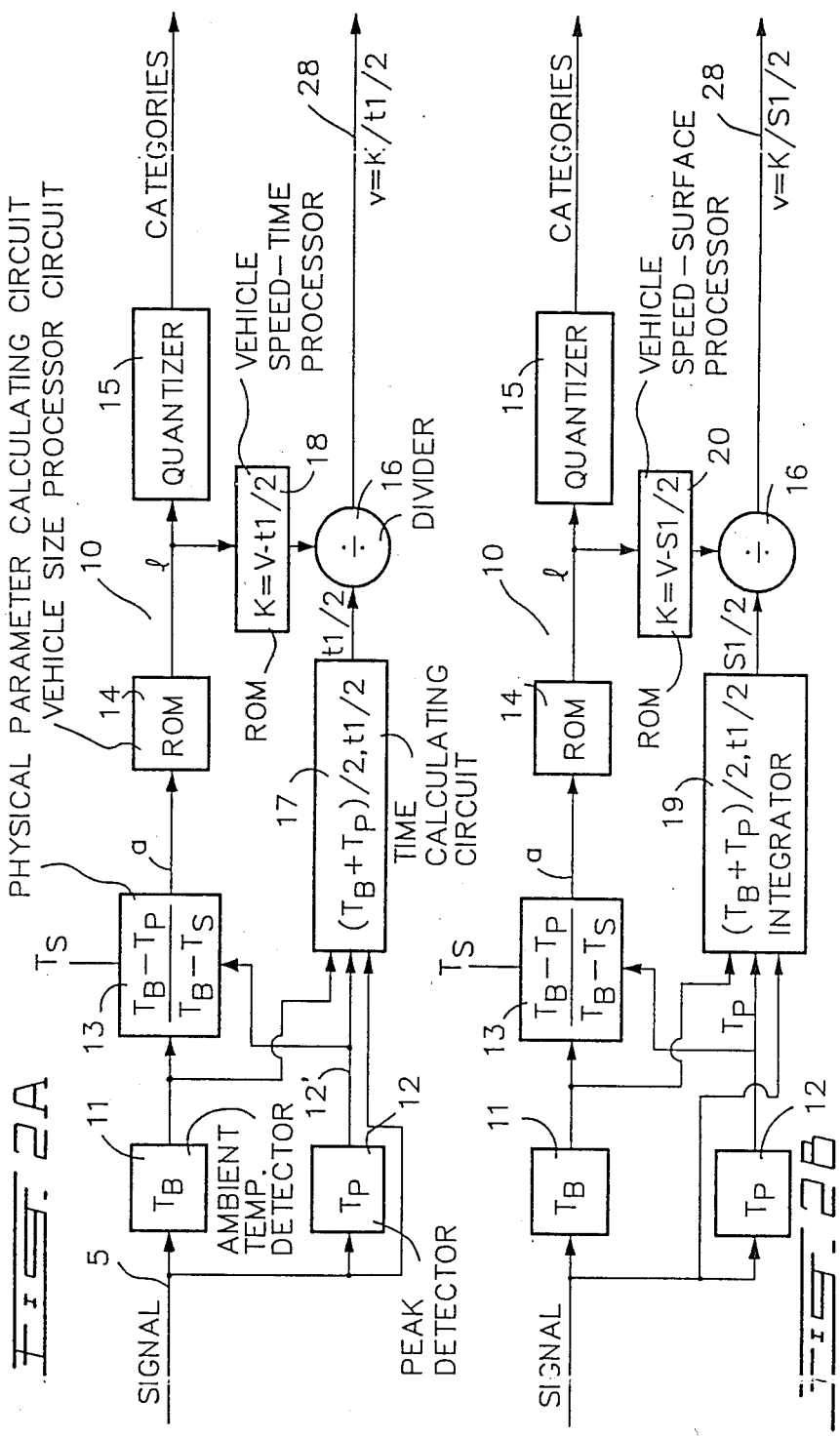

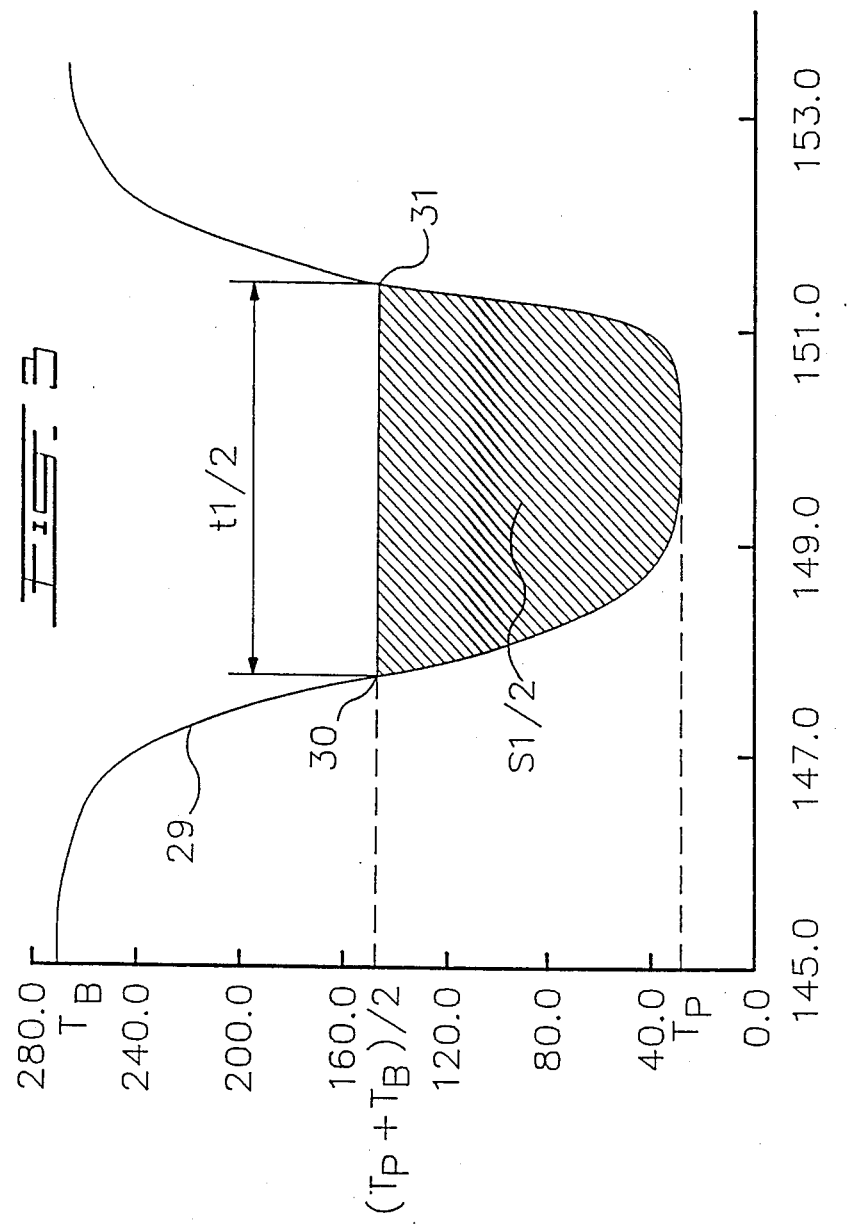

MICROWAVE SIZE/SPEED VEHICLE DETECTOR

The present invention relates to an apparatus and a method for detecting a physical parameter, such as length of a vehicle as well as an approximation of the vehicle's speed by utilizing reflected signals in the beam of a microwave antenna.

Microwave radiometers find application in many areas of passive remote sensing including aircraft navigation and landing aids, pollution surveillance, meteorology, oceanology, etc. In Canadian Pat. No. 1,057,834 issued July 3, 1979, there is described an elementary form of a microwave radiometer utilized for the detection of vehicles on a roadway. The sensing apparatus was suggested to be used for providing a count of vehicles as well as data regarding the type of each vehicle sensed by the radiometer. The amplitude of the received signal was used to give an indication of the size of the vehicle speed. However, because of the ambient temperature fluctuation on one hand and the lack of information on the other, the problems involved with the determination of the size of vehicle as well as its speed remained practically unsolved.

It is a feature of the present invention to provide an electronic vehicle sensing apparatus which can be used for the determination of vehicle size and/or length, in the presence of ambient temperature fluctuation to provide signals capable of being classified in various desired categories.

Another feature of the present invention is to provide an electronic vehicle sensing apparatus which can detect a vehicle's average speed within an acceptable accuracy.

Another feature of the present invention is to provide an improved vehicle sensing apparatus which is relatively compact and simple and can operate under all weather conditions, day or night, regardless of the ambient temperature variation.

According to the above features, from a broad aspect, the present invention provides a vehicle sensing apparatus which comprises a directional microwave nonemitting antenna for collecting reflected microwave signals from above a roadway. An electronic vehicle sensing circuit is connected to the antenna for processing detected signals to identify a vehicle's physical parameter. The sensing circuit has an ambient temperature detector and a peak detector. The peak detector detects a reflected temperature signal at the antenna and generates a detected temperature signal. A physical parameter calculating circuit is provided for determining the true amplitude of the detected signal and interpreted by the maximum ratio of the solid angles of the beam filled by the vehicle to be detected and a roadway in the beam of the antenna.

The amplitude determination is obtained by the formulation:

$$a = (T_B - T_P)/(T_B - T_S)$$

where
a is the true amplitude of the detected signal,
$T_B$ is the ambient temperature in degree Kelvin,
$T_P$ is the minimum amplitude of the received temperature, and
$T_S$ represents the sky temperature in degree Kelvin. Processing circuit means if further provided to identify the vehicle physical parameter.

In effect, by experimentation, there is a non-linear relation between the amplitude value "a" and the vehicle length in function of the antenna height and direction with respect to the vertical line. This empirical relation is pre-calculated and implemented by a ROM (read only memory) for a given height and direction of the antenna.

There exists also another empirical relation between the vehicle length and the antenna footing length "k" projected on a vehicle effective height plan. This relation is also stored in another ROM. The vehicle velocity can be furthermore obtained by the calculation:

$$v = k/t_{\frac{1}{2}}$$

where $t_{\frac{1}{2}}$ corresponds to $\frac{1}{2}(T_B + T_P)$ defined as the half pulse time.

A preferred embodiment of the present invention will now be described with reference to the accompanying drawings in which:

FIG. 1 is a simplified block diagram, in schematic form, illustrating the interconnection of the vehicle sensing apparatus of the present invention with respect to a microwave antenna positioned above a roadway;

FIGS. 2a and 2b are block schematic diagrams of the network used for identifying the physical parameter and velocity of the vehicle passing through the microwave beam;

FIG. 3 is a typical example of the received signal; and

FIG. 4 is a block schematic diagram of the network used for ambient temperature evaluation.

Referring now to the drawings and more particularly to FIG. 1, there is shown the vehicle sensing apparatus 10 of the present invention as connected to a microwave, non-emitting antenna 9 which is positioned above a roadway 8 with one or more lanes of traffic whereby to detect a physical parameter, such as the length of a vehicle 7 travelling on the roadway 8. A suitable recording device 6 may be connected to the output of the vehicle sensing apparatus 10 whereby to provide a visual display or a recording of the size and velocity of vehicle 7 travelling through the beam of the antenna 9. Of course, there may be an antenna 9 positioned over each lane of a multi-lane highway with switch means for connecting each antenna to the processing means in a time sharing mode.

Referring further to FIG. 2a, there will be described the construction of the sensing circuit 10 (FIG. 1) which is connected to the antenna 9 (FIG. 1). The input signal at input connection 5 is connected to an ambient temperature detector circuit 11 and a peak detector 12 for detecting a reflected temperature signal represented by the input signal 5. The peak detector 12 generates a detected temperature signal on its output 12' which is fed to a true amplitude calculating circuit 13 as well as a half pulse time calculating circuit 17.

The calculating circuit 13 determines the true amplitude of a detected signal and this is interpreted by the maximum ratio of the solid angles of the antenna beam filled by the vehicle to be detected and a roadway in the beam of the antenna 9. The amplitude determination is obtained by the formulation:

$$a = (T_B - T_P)/(T_B - T_S)$$

where,
a is the true amplitude of the detected signal,
$T_B$ is the ambient temperature in degree Kelvin, $T_P$ is the minimum amplitude of the received temperature, and $T_S$ represents the sky temperature in degree Kelvin. The detected value "a" at the output of the calculating circuit 13 is fed to a processing circuit 14, herein a READ ONLY memory, where the physical parameters, such as the length of the vehicle 7 passing through the beam of the antenna 9 is identified and fed to a quantizer circuit 15 where the signal is classified in accordance with specific categories of vehicle to generate an output signal identifying the specific classification or classed type of vehicle, i.e. large truck, small truck, large car, small car, etc.

Referring now additionally to FIG. 3, the time calculating circuit 17 measures the time difference $t_{\frac{1}{2}}$ between two points 30 and 31 of the detected signal 29 when it reaches the value $T_P+T_B$ (divided by two and the area $S_{\frac{1}{2}}$ of the detected signal 29 between the two points. This time calculating circuit 17 generates on its output a correcting signal which may be either a function of the time difference $t_{\frac{1}{2}}$ between the two points of the detected signal, as shown in FIG. 2a or a function of the area $S_{\frac{1}{2}}$ of the detected signal, as shown in FIG. 2b. In FIG. 2b, the velocity calculating circuit is an integrator 19 and such integrator circuit may be used as it is insensible to impulse noise. Accordingly, it would provide a more reliable output signal representative of the velocity or speed of a vehicle.

As shown in both FIGS. 2a and 2b, the output of the physical parameters calculating circuit 10 is connected to a ROM (read only memory) 18 (FIG. 2a) or 20 in (FIG. 2b) programmed for generating a value which is expressed, in FIG. 2a, by the formula:

$$k = v.t_{\frac{1}{2}}$$

where
k is a constant considered as effective antenna footing length
$t_{\frac{1}{2}}$ is the half pulse time, and
v is the velocity signal of a detected vehicle.

In FIG. 2b, this vehicle speed processor 20 provides a velocity signal which is expressed as:

$$k' = v.S_{\frac{1}{2}}$$

where the dimension of the constant k' is (meter.°K.),
v is the velocity signal of a detected vehicle,
$S_{\frac{1}{2}}$ is the area between the measured points 30 and 31 in FIG. 3 at the value $(T_P+T_B)/2$ of the detected signal. The dimensions $S_{\frac{1}{2}}$ is (°K.sec). Both the outputs of the vehicle speed processors 18 and 20 are fed to a divider circuit 16 which is also fed by the output signal from the time calculating circuits 17 and 19 whereby to provide a corrected velocity output signal (v) on the output 28.

FIG. 4 illustrates the network used for evaluating the ambient temperature in the area of the microwave antenna 9 and as herein represented with the mathematical formulas, it is believed that the circuit is self-explanatory and consists of a comparator for detecting a background signal level and a narrow band low pass digital filter to provide an output signal $V_{BK}$ which is representative of the ambient temperature $T_B$. The filter bandwidth is just large enough for the ambient temperature variation. The specific circuit construction is not at the point of invention and obvious to a person skilled in the art.

This filter is used for the evaluation of the ambient temperature in the case of both absence or presence of a moving vehicle on the roadway. The amplitude "a" for a received signal can generally be said to be proportional to the temperature of the area or object in the area observed. Using this fact and a processing unit, the vehicle's length and/or speed can be evaluated even with the presence of the ambient temperature variation. These length informations can then be classified in three or five desired categories to identify various size vehicles.

It is pointed our that the vehicle sensing apparatus of the present invention may also be utilized for identifying aircraft vehicles in the vicinity of an airport or at the end of runways. The antenna 9 would point to the sky and the processing means operate much the same as described herein but collecting reflected signals solely from the airplanes to determine their size, speed, etc.

It is within the ambit of the present invention to cover any obvious modifications of the circuit described herein, provided such modifications fall within the scope of the appended claims.

We claim:

1. A vehicle sensing apparatus comprising a directional microwave non-emitting antenna for collecting reflected microwave signals from above a predetermined roadway area, an electronic vehicle sensing circuit connected to said antenna for processing detected reflected signals from said roadway and from a vehicle travelling through said area to identify a vehicle's physical parameter; said sensing circuit having an ambient temperature detector, a peak detector for detecting a reflected temperature signal at said antenna caused by said vehicle entering said area and generating a detected minimum amplitude signal, and a physical parameter calculating circuit for determining the true amplitude of the detected signal and interpreted by the maximum ratio of the solid angles of the antenna beam filled by the vehicle to be detected and a roadway in the beam of the antenna, said true amplitude determination being obtained by the formulation:

$$a = (T_B - T_P)/(T_B - T_S)$$

where
a is the true amplitude of the detected signal,
$T_B$ is the ambient temperature in degree Kelvin,
$T_P$ is the minimum amplitude of the received temperature, and
$T_S$ represents the sky temperature in degree Kelvin,
a processing circuit means having a memory processor circuit connected to an output of said calculating circuit for generating at an output thereof a signal proportional to the vehicle length parameter for identification of a class of vehicle, a vehicle speed/time calculating circuit connected to said output of said memory processor circuit for measuring characteristic parameters of said received reflected temperature signal, said speed time calculating circuit being connected to a divider circuit which is also connected to a time calculating circuit fed by said peak detector whereby to obtain the mean speed of said vehicle travelling through said predetermined area.

2. A vehicle sensing apparatus as claimed in claim 1, wherein a time calculating circuit is connected to an output of said peak detector for measuring the time difference $t_{\frac{1}{2}}$ between two points of the detected signal reaching the value $(T_P+T_B)$ or the area $S_{\frac{1}{2}}$ of the detected signal between said two points, and generating a representative output signal.

3. A vehicle sensing apparatus as claimed in claim 2, wherein said vehicle speed-surface calculating circuit generates a velocity signal expressed by the formulation:

$$k' = v.S_{\frac{1}{2}}$$

where k' is a constant in meters °K., v is the velocity signal of a detected vehicle, and $S_{\frac{1}{2}}$ is the area between measured points at the value $(T_P+T_B)/2$ of the detected signal, said time calculating circuit being an integrator circuit generating a representative signal which is a function of said area $S_{\frac{1}{2}}$ of said detected signal and which is insensible to impulse noise.

4. A vehicle sensing apparatus as claimed in claim 2, wherein said vehicle speed-time calculating generates at its output a vehicle signal expressed by the formulation:

$$k = v.t_{\frac{1}{2}}$$

where k is a constant considered as effective antenna footing length projected on a vehicle effective height plan, $t_{\frac{1}{2}}$ is the half pulse time signal, and v is the velocity of a detected vehicle.

5. A vehicle sensing apparatus as claimed in claim 4, wherein said representative signal is a function of said time difference $t_{\frac{1}{2}}$ between two points of said detected signal.

6. A vehicle sensing apparatus as claimed in claim 1, wherein said ambient temperature detector is a non-linear recursive filter capable of evaluating the ambient temperature during the presence or absence of a vehicle in the beam of said antenna.

7. An apparatus as claimed in claim 1, wherein said roadway area comprises one lane of vehicle traffic.

8. An apparatus as claimed in claim 1, wherein said roadway area comprises two or more lanes of vehicle traffic.

9. An apparatus as claimed in claim 1, wherein said roadway area comprises two or more lanes of vehicle traffic, providing a directional microwave antenna for each lane, and switching means for connecting each antenna to said processing means in a time-sharing mode.

10. A vehicle sensing apparatus as claimed in claim 1 wherein there is further provided a quantizer circuit connected to an output of said memory processor circuit to generate an information signal representative of the physical parameter of said detected vehicle in accordance with a selected classified parameter.

11. A method for detecting a parameter of a vehicle travelling on a predetermined roadway area, said method comprising the steps of:

(i) collecting microwave reflected signals by a directional microwave non-emitting antenna positioned over said area of a roadway, (ii) detecting the ambient temperature in said area;

(iii) a peak detector for detecting a reflected temperature signal at said antenna from a vehicle travelling through said predetermined area and generating an amplitude signal, (iv) calculating the true amplitude signal representative of said reflected temperature signal, (v) processing said true amplitude signal in a speed-time calculating circuit for measuring characteristic parameters of said reflected temperature signal, and (vi) processing in a divider an output signal of said speed-time calculating circuit and an output signal from a time calculating circuit fed by said amplitude signal to generate a mean speed value output indicative of said vehicle travelling in said roadway area.

12. A method as claimed in claim 11 wherein there is further provided the step of classifying said signal proportional to said vehicle length parameter in accordance with a selected classified parameter to determine the category of said detected vehicle.

* * * * *